May 4, 1954
C. J. MEYER
2,677,465
STRAINER ASSEMBLY
Filed Sept. 7, 1951
2 Sheets-Sheet 1
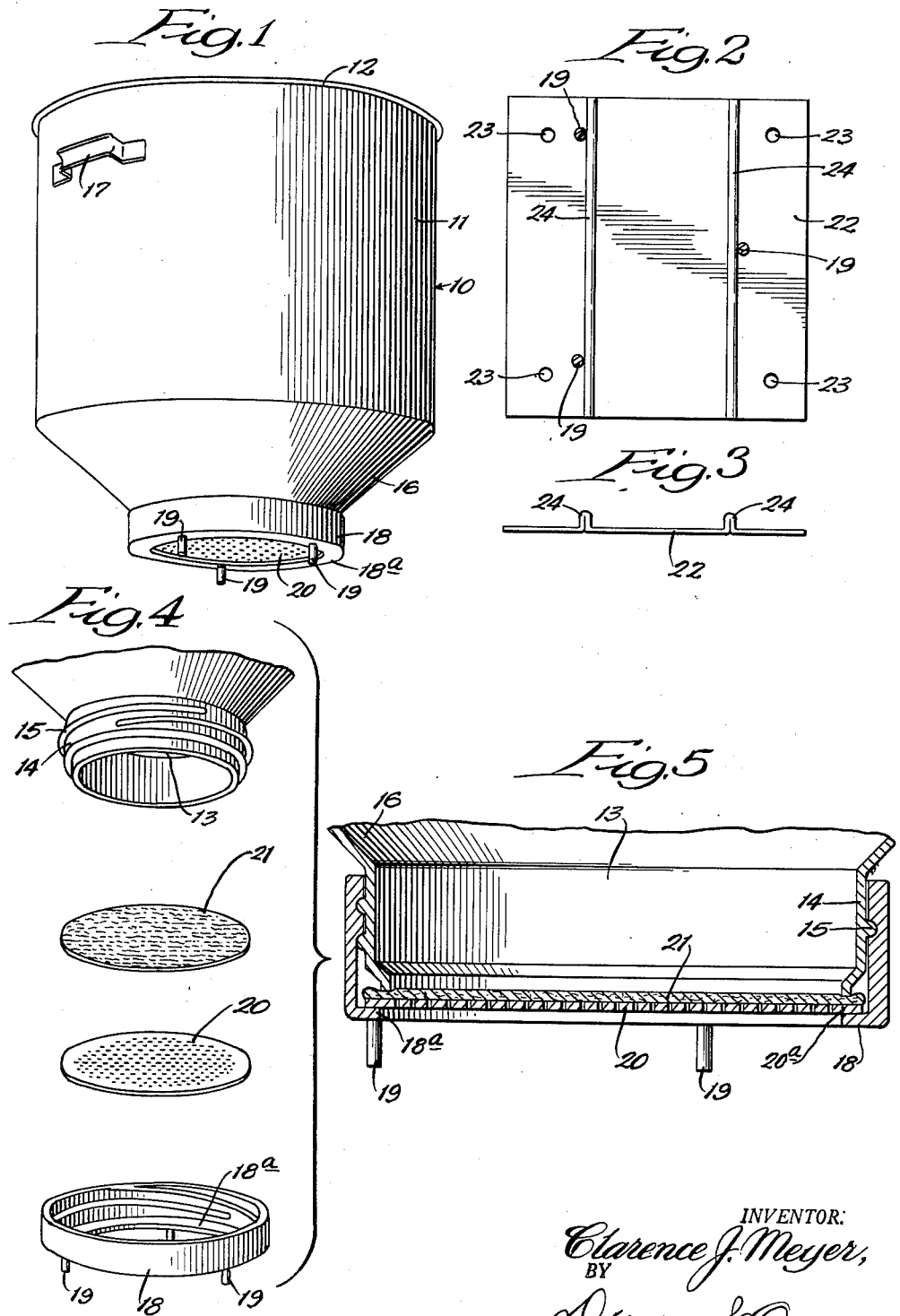
INVENTOR:
Clarence J. Meyer,
BY
Dawson & Ooms,
ATTORNEYS.

May 4, 1954  C. J. MEYER  2,677,465
STRAINER ASSEMBLY
Filed Sept. 7, 1951  2 Sheets-Sheet 2
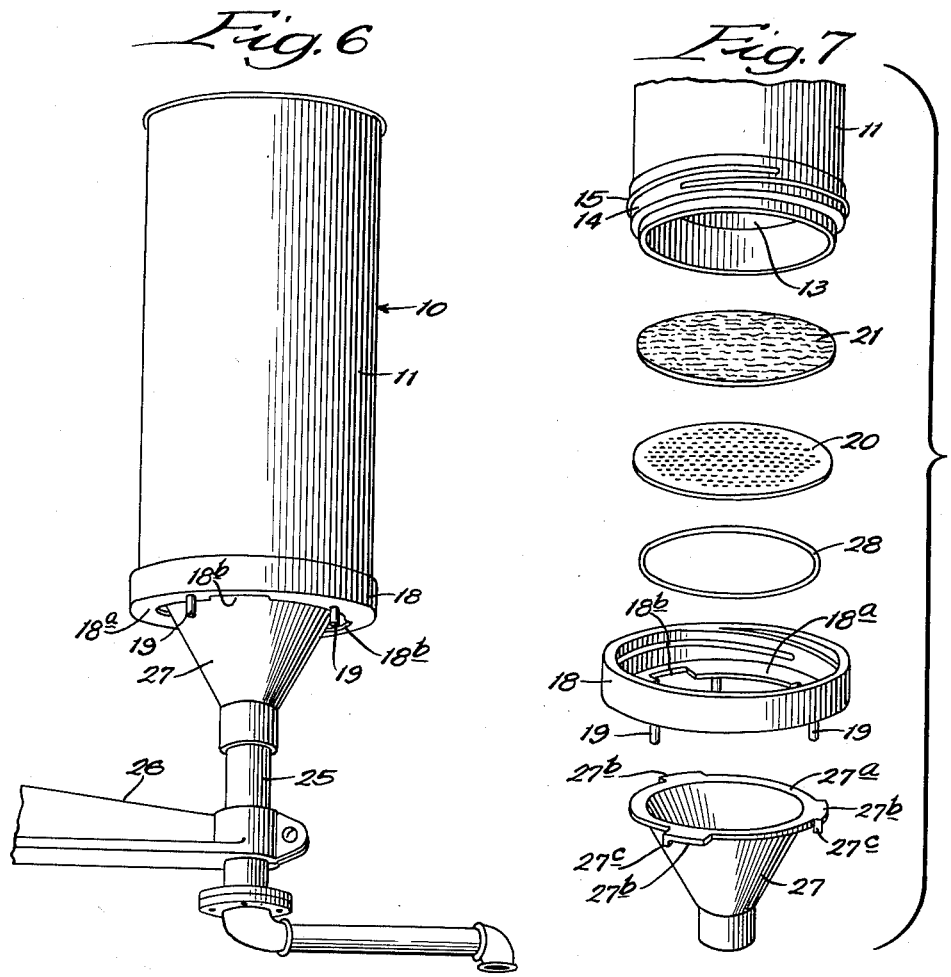
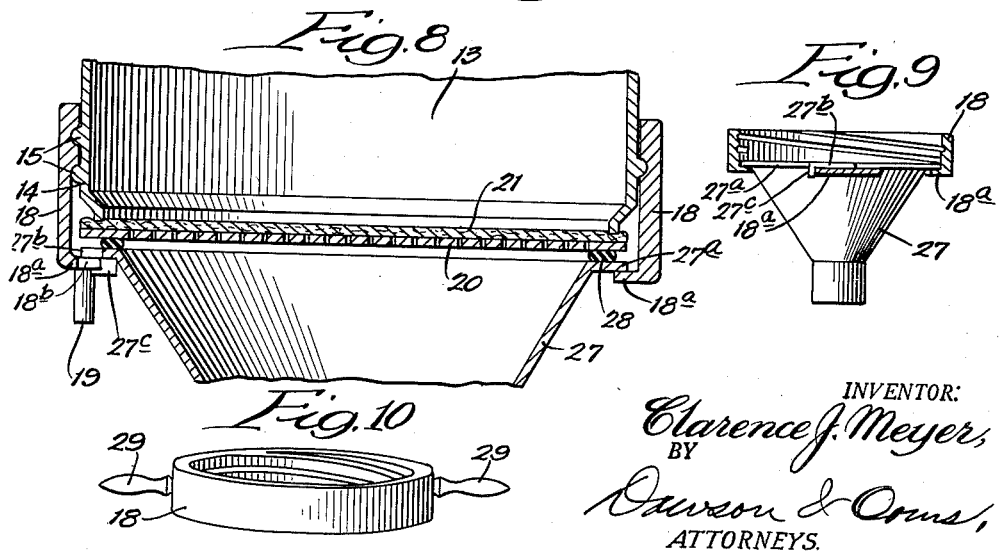
INVENTOR:
Clarence J. Meyer,
BY
Dawson & Ooms,
ATTORNEYS.

Patented May 4, 1954

2,677,465

UNITED STATES PATENT OFFICE 2,677,465

STRAINER ASSEMBLY

Clarence J. Meyer, St. Olaf, Iowa

Application September 7, 1951, Serial No. 245,521

1 Claim. (Cl. 210—159)

My invention relates to a strainer assembly, and more particularly to a strainer assembly which is adapted both for straining liquids directly into containers and for straining them into pipe lines. My strainer assembly has particular utility in connection with the straining of milk.

It is of utmost importance in the handling of milk to maintain the equipment employed in a clean and sanitary condition. This requirement has presented a problem in the use of milk strainers, since it is necessary to assemble and disassemble the strainer each time that it is used to permit washing of the strainer elements, and the insertion of a fresh filtering disk. Heretofore, these assembly and disassembly operations have been relatively time consuming. In most of the presently used milk strainers, a filtering disk is secured between clamping members across the outlet of the strainer, and it is necessary to turn the clamping members relative to each other to secure the disk in position. It is desired that the filtering disk be held in a flat, wrinkle-free condition against the disk supporting member, and that the periphery of the disk be clamped tightly enough between the members to provide a liquid-tight seal entirely around the disk to prevent by-passing or leaking of the milk. Many of the difficulties connected with the assembly of milk strainers have been connected with the securing of the filtering disk in this manner. Because of the difficulty of applying sufficient turning force to the clamping members, it has been necessary to provide special types of disk constructions and to adapt the clamping members in various ways so that the disk is held flat while the strainer is inverted during the assembly operation and so that a liquid-tight seal is obtained even though it is possible to apply only a small amount of turning force to the clamping members. The use of cooperating threads on the clamping members has presented a problem in this connection, since, although it is desired to employ threads on the members because of their durability, etc., the use of threads has not been practical in conjunction with the use of a simple flat-type filtering disk because of the difficulty of applying sufficient turning force to the members to clamp the edges of the filtering disk therebetween in a liquid-tight manner.

It is therefore an object of my invention to provide a milk strainer which is adapted to facilitate the assembling and disassembling of the parts so that all of the required operations can be performed both conveniently and rapidly. More specifically, it is an object of my invention to provide a milk strainer which can be assembled in an upright position so that prior to being clamped in position the filtering disk will lie flat on its supporting plate, and so that no upper plate will be required to hold the filtering disk in place. Also, it is an object of my invention to provide a novel means for applying turning force to the clamping members whereby a relatively great amount of leverage can be obtained so that the clamping members can be threaded for convenient and rapid assembly, while making possible the bringing of the clamping members together with sufficient force to obtain a liquid-tight seal between these members and the periphery of a flat filtering disk. It is a still further object of my invention to provide a strainer which is adapted for attachment to a pipe line by having the disk support plate separately formed from the cap member to permit the insertion of a funnel flange between the cap and the plate. Further objects and advantages will appear as the specification proceeds.

My invention is shown in an illustrative embodiment in the accompanying drawing in which—

Figure 1 is a perspective view of a strainer embodying the features of my invention and showing particularly the legs extending downwardly from the bottom of the cap member for holding the cap member in a fixed position while turning force is being applied to the casing; Fig. 2, a plan view of a wrench plate for use in assembling and disassembling the milk strainer of Fig. 1; Fig. 3, a side elevational view of the wrench plate of Fig. 2; Fig. 4, a fragmentary perspective view of the structure of Fig. 1 showing the parts in separated relation; Fig. 5, a cross sectional view of the lower portion of the strainer of Fig. 1 showing the parts in assembled relation; Fig. 6, a perspective view similar to Fig. 1 showing a modified strainer assembly attached to a pipe line by means of a funnel; Fig. 7 a fragmentary perspective view of the main parts of the structure of Fig. 6 showing these parts in separated relation; Fig. 8, a cross sectional view showing the parts of Fig. 7 in assembled relation; Fig. 9, a detail sectional view of the ring and funnel of Fig. 8 with the other parts removed showing the interlocking of these parts when assembled; and Fig. 10, a perspective view of a modification of the ring of Figs. 1, 4 and 5.

In the illustration given, a milk strainer is shown having a casing 10 providing a bowl portion 11 with an inlet 12 in the top and an outlet 13 in the bottom. An annular neck 14 equipped externally with threads 15, which are preferably of the half or broken thread type, is provided about outlet 13. Preferably, neck portion 14 is of reduced diameter from bowl portion 11 and is connected thereto by an inwardly tapering portion 16. If desired, casing 10 can be equipped with suitable handles 17.

A cap or ring member 18 is received on neck 14 in threaded engagement therewith and is equipped with an annular flange 18a extending inwardly from cap 18 below the lower end of neck 14. It will be understood that ring 18 and cap 14 will be caused to move relative to each other when one member is held stationary and turning force is applied to the other member. To facilitate the application of this turning force, cap 18 is provided with depending leg means, which can be of any suitable construction for supporting the strainer and for cooperating with a locking means to hold ring 18 stationary on a horizontal surface while turning force is applied to casing 11. In the illustration given, cap 18 is provided with three short legs 19 which extend downwardly in spaced apart relation from flange 18a. It will be apparent that more than three legs can be employed, although three legs are preferred since they provide a stable support for the strainer and prevent it from tipping during the assembly operation. The function of legs 19 will be subsequently described in detail.

A separate multi-perforated plate 20 is adapted to be supported by flange 18a and has imperforate edge portions 20a lying beneath the lower end of neck 14, as shown more clearly in Fig. 5. A filtering disk 21, which can be of any suitable construction, is supported on plate 20 with its periphery extending outwardly beyond the lower edge of neck 14. With this arrangement, the tightening of ring 18 on neck 14 will clamp disk 21 between the lower end of neck 14 and perforated plate 20.

To assist in clamping the members together, I prefer to employ a wrench plate 22, as shown in Figs. 2 and 3. Wrench plate 22 is anchored to a horizontal surface, by any suitable means. If desired, plate 22 can be equipped with apertures 23 to assist in anchoring the plate by means of nails, bolts, etc. In the illustration given and preferably, plate 22 is provided with two parallel ridges 24 spaced apart so as to just lie between legs 19, as indicated in Fig. 2. Thus, ridges 24 will cooperate with legs 19 in holding ring 18 stationary and in an upright position for the assembling and disassembling of the milk strainer.

In Figs. 6 to 9 there is shown a modification of the strainer of Fig. 1 (tapered portion 16 is omitted) adapted for attachment to a pipe line. In the illustration given, there is shown a pipe line 25 which is rigidly supported by bracket 26. On the upper end of pipe 25 there is mounted a funnel 27 which has its lower end adapted to be threadedly connected to pipe 25. Preferably, funnel 27 is provided at its top with an outwardly extending annular flange 27a, as seen more clearly in Fig. 7. To permit the attachment of the strainer to funnel 27 while the parts of the strainer are in assembled relation, it is desirable to have the diameter of flange 27a slightly smaller than the inside diameter of neck flange 18a.

To provide for the interlocking of funnel 27 and ring 18, funnel flange 27a can be provided with spaced ears 27b, and ring 18 can be provided with correspondingly spaced notches 18b. Thus, ring 18 can be pushed downwardly over funnel 27 by aligning notches 18b with ears 27b to limit the turning of ring 18 relative to funnel 27 and to provide for the interlocking of these members, ears 27b can be provided at one end with stop lugs 27c for engaging the ends of notches 18b. When the strainer is to be attached to a pipe line, it is also desirable to provide a resilient washer 28 to rest on top of annular flange 27a and against plate 20, as shown more clearly in Fig. 8.

In Fig. 10, there is shown a modification of ring 18 in which the ring is equipped with oppositely disposed laterally extending turning pins 29 which are adapted to be used in clamping ring 18 on neck 14. With this structure ring 18 need not be provided with notches 18b and can be lowered about funnel 27 and pipe 25 to rest on support arm 26 in disassembling the members.

*Operation*

In using my strainer, I prefer to anchor wrench plate 22 to a convenient horizontal surface in the area in which it is desired to assemble and disassemble the strainer. Ring 18 can then be placed on top of plate 22 with legs 19 straddling ridges 24 in the manner shown in Fig. 2. In this position, ridges 24 and legs 19 cooperate to hold ring 18 in a fixed position on plate 22 during the assembly operation. Perforated plate 20 is next placed within ring 18 upon flange 18a. It will be noted that the legs 19 support ring 18 well above the surface of plate 22 so that there is no danger of contacting plate 20 therewith after it is inserted in ring 18.

The next step is the placing of filtering disk 21 on top of plate 20. Casing 11 can then be lifted bodily by handles 17 and held in an upright position over ring 18 for the insertion of neck 14 within ring 18. Both hands of the user can be employed for applying the turning force to the top of casing 10 to screw neck 14 into ring 18 until disk 21 has its outer edges tightly clamped between the lower end of neck 14 and the imperforate portion 20a of plate 20. It will be noted that during the clamping of filtering disk 21 that it is allowed to rest on plate 20, and there is therefore no tendency for it to wrinkle or to separate from plate 20.

When my strainer is adapted for attachment to a pipe line as illustrated in Figs. 6 to 9, ring 19, plate 20, disk 21, and casing 10 can be assembled on wrench plate 22 exactly as described above, except that the parts are left in loose engagement so that plate 20 can be moved upwardly a short distance from flange 18a. The assembled strainer can then be lifted from wrench plate 22 and brought above the top of funnel 27 with notches 18b in alignment with ears 27b. It will be understood that funnel 27 has previously been attached to the upper end of a rigidly supported pipe line 25, as shown in Fig. 6. The strainer is then pushed downwardly so that funnel 27 moves plate 20 upwardly to the position shown in Fig. 8. Casing 10 is then rotated in the direction required for tightening ring 18 on neck 14. This causes ring 18 to be turned with respect to funnel 27 so that ears 27b are brought above the portions of flange 18a between notches 18b, and stop lugs 27c are engaged with the ends of notches 18b. This prevents further rotation of ring 18 with respect to funnel 27 so that the further turning of casing 10 brings about the tightening of ring 18 on neck 14 until disk 21 is tightly clamped between the lower end of neck 14 and plate 20.

If desired, a resilient washer 28 can be placed on top of funnel flange 27a prior to the lowering of the strainer onto the funnel so that a liquid-tight seal will be provided between plate 20 and flange 27a, as shown in Fig. 8.

In disassembling my strainer, I have also found it convenient to employ wrench plate 22. The assembled strainer, as shown in Fig. 1, can be placed on the wrench plate with the legs in the position indicated in Fig. 2, and turning force applied by the hands to casing 11 to loosen ring 18 on neck 14. If desired, the parts can be completely separated by the use of wrench plate 22, or the strainer can be inverted and ring 18 unscrewed by hand. When the strainer is attached to a pipe line, as shown in Fig. 6, it is only necessary to apply turning force in a loosening direction to casing 10 to bring ears 27b back into alignment with notches 18b. The strainer can then be disengaged from funnel 27 and placed on wrench plate 22 to complete the separation of the parts in the manner previously indicated.

Although in describing the assembly and disassembly steps it may appear that these steps require considerable time, in actual practice the strainer can be assembled and disassembled with great rapidity.

I wish it to be particularly understood that while the strainer assembly of my invention has particular utility in connection with the straining of milk that it can also advantageously be used for the straining of many other liquids either directly into containers or into pipe lines. For some applications, it may be desirable to pump the liquid into bowl portion 11 with considerable force which therefore might have a tendency to damage filtering disk 21. Therefore, if desired, a multi-perforated plate such as plate 20 or similar member can be positioned above pad 21 and clamped between neck 14 and ring 18 to protect disk 21.

While in the foregoing specification I have described a strainer embodying my invention in considerable detail for purpose of illustration, it will be apparent to those skilled in the art that many of the details can be varied widely without departing from the spirit of my invention.

I claim:

A strainer, comprising a casing providing a bowl with an inlet in the top and an outlet in the bottom and having an annular neck about said outlet, a ring received on said neck in threaded engagement therewith and equipped with an annular flange extending inwardly therefrom below the lower end of said neck, said neck flange having spaced notches at the outer edge thereof, a funnel with an annular flange extending outwardly from the top thereof of slightly smaller outside diameter than the inside diameter of said neck flange, said funnel flange being equipped with spaced ears extending outwardly from its periphery and arranged to be inserted through said neck flange notches and rotated over the portions of said neck flange between said notches for securing said funnel to said strainer, said funnel and said ring having cooperating stop means arranged to stop the turning of said funnel with respect to said ring after said ears have been turned over the portions between said notches, and a filtering disk is clamped between said plate and the lower end of said neck.

References Cited in the file of this patent

UNITED STATES PATENTS

| Number | Name | Date |
|---|---|---|
| 65,515 | Spencer | June 4, 1867 |
| 593,834 | Chambers | Nov. 16, 1897 |
| 674,530 | Wilcox | May 21, 1901 |
| 1,015,946 | Ebner | Jan. 30, 1912 |
| 1,134,837 | Fox | Apr. 6, 1915 |
| 1,820,610 | Eves | Aug. 25, 1931 |

FOREIGN PATENTS

| Number | Country | Date |
|---|---|---|
| 238,803 | Great Britain | Aug. 27, 1925 |
| 241,393 | Great Britain | Oct. 22, 1925 |